United States Patent
Ur Rehman et al.

(10) Patent No.: US 11,266,158 B2
(45) Date of Patent: *Mar. 8, 2022

(54) NON-BROWNING LACTOSE-FREE MILK POWDER AND METHODS OF MAKING SAME

(71) Applicant: fairlife, LLC, Chicago, IL (US)

(72) Inventors: Shakeel Ur Rehman, Naperville, IL (US); Brandon Kopesky, Chicago, IL (US); Calvin White, Chicago, IL (US); Scott Backinoff, La Grange, IL (US); Timothy Peter Doelman, Glencoe, IL (US)

(73) Assignee: fairlife, LLC, Chicago, IL (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/705,340

(22) Filed: Dec. 6, 2019

(65) Prior Publication Data

US 2020/0107556 A1   Apr. 9, 2020

Related U.S. Application Data

(63) Continuation of application No. 15/828,499, filed on Dec. 1, 2017, now Pat. No. 10,542,763.

(60) Provisional application No. 62/429,090, filed on Dec. 2, 2016.

(51) Int. Cl.
| | | |
|---|---|---|
| *A23C 9/152* | (2006.01) | |
| *A23C 1/16* | (2006.01) | |
| *A23C 9/13* | (2006.01) | |
| *A23C 9/12* | (2006.01) | |
| *A23C 9/142* | (2006.01) | |
| *A23C 3/03* | (2006.01) | |
| *A23C 1/04* | (2006.01) | |
| *A23C 1/12* | (2006.01) | |
| *A23C 1/14* | (2006.01) | |
| *A23C 3/08* | (2006.01) | |
| *A23C 9/18* | (2006.01) | |
| *A23L 3/349* | (2006.01) | |

(52) U.S. Cl.
CPC ............... *A23C 9/152* (2013.01); *A23C 1/04* (2013.01); *A23C 1/12* (2013.01); *A23C 1/14* (2013.01); *A23C 1/16* (2013.01); *A23C 3/03* (2013.01); *A23C 3/08* (2013.01); *A23C 9/1206* (2013.01); *A23C 9/13* (2013.01); *A23C 9/1422* (2013.01); *A23C 9/1427* (2013.01); *A23C 9/18* (2013.01); *A23L 3/349* (2013.01); *A23C 2200/00* (2013.01); *A23C 2240/15* (2013.01); *A23V 2002/00* (2013.01); *A23V 2200/048* (2013.01); *A23V 2250/2132* (2013.01); *A23V 2250/54* (2013.01); *A23V 2250/612* (2013.01); *A23V 2300/10* (2013.01); *A23V 2300/50* (2013.01)

(58) Field of Classification Search
CPC .. A23C 9/152; A23C 1/04; A23C 1/12; A23C 1/14; A23C 1/16; A23C 3/03; A23C 3/08; A23C 9/1206; A23C 9/13; A23C 9/1422; A23C 9/1427; A23C 9/18; A23C 2200/00; A23C 2240/15; A23L 3/349; A23V 2002/00; A23V 2200/048; A23V 2250/2132; A23V 2250/54; A23V 2250/612; A23V 2300/10; A23V 2300/50
USPC ............................ 426/34, 42, 334, 580, 588
See application file for complete search history.

(56) References Cited

U.S. PATENT DOCUMENTS

| | | |
|---|---|---|
| 2,349,227 A | 5/1944 | Thorneloe |
| 2,663,642 A | 12/1953 | Whitaker et al. |
| 2,831,771 A | 4/1958 | McDonald et al. |
| 4,401,657 A | 8/1983 | Kashiwabara et al. |
| 4,529,611 A | 7/1985 | Uiterwaal |
| 4,853,246 A | 8/1989 | Stevens |
| 5,104,676 A | 4/1992 | Mahmoud et al. |
| 5,397,589 A | 3/1995 | Korte et al. |
| 5,436,020 A | 7/1995 | Kuwata et al. |
| 5,711,982 A | 1/1998 | Takemori et al. |
| 6,139,901 A | 10/2000 | Blazey et al. |
| 6,471,999 B2 | 10/2002 | Couzy et al. |
| 6,551,633 B2 | 4/2003 | Couzy et al. |
| 6,599,553 B2 | 7/2003 | Kealey et al. |
| 6,827,960 B2 | 12/2004 | Kopf et al. |
| 6,852,352 B2 | 2/2005 | Kopf et al. |
| 6,875,459 B2 | 4/2005 | Kopf et al. |
| 6,972,282 B1 | 12/2005 | Tossavainen et al. |
| 7,169,428 B2 | 1/2007 | Dunker et al. |
| 7,544,296 B2 | 6/2009 | Kopf et al. |
| 7,829,130 B2 | 11/2010 | Tossavainen et al. |
| 7,846,482 B2 | 12/2010 | Cupp et al. |
| 7,851,005 B2 | 12/2010 | Bingley et al. |

(Continued)

FOREIGN PATENT DOCUMENTS

| | | |
|---|---|---|
| EP | 2272374 | 1/2011 |
| JP | 2002/291406 | 10/2002 |

(Continued)

OTHER PUBLICATIONS

International Search Report and the Written Opinion of the International Searching Authority in PCT/US2017/064163 dated Feb. 6, 2018, 14 pages.

Kokkinidou, S., Inhibition of Maillard Reaction Pathways and Off-flavor Development in UHT milk: Structure Reactivity of Phenolic Compounds A Dissertation Submitted to the Faculty of University of Minnesota, Jan. 2013.

(Continued)

*Primary Examiner* — Leslie A Wong

(74) *Attorney, Agent, or Firm* — Merchant & Gould P.C.

(57) ABSTRACT

Disclosed are processes for preparing dry or powder dairy compositions having low lactose contents and containing polyphenol compounds. The resultant dry or powder dairy compositions can be used to form reconstituted fluid dairy products, which can have improved organoleptic properties, such as less cooked flavor, sulfur odor, and brown color.

20 Claims, No Drawings

(56) References Cited

U.S. PATENT DOCUMENTS

| | | |
|---|---|---|
| 8,021,704 B2 | 9/2011 | Merrill et al. |
| 8,282,976 B2 | 10/2012 | Dörr et al. |
| 8,367,138 B2 | 2/2013 | Prakash et al. |
| 8,449,938 B2 | 5/2013 | Tossavainen et al. |
| 8,455,005 B2 | 6/2013 | Cupp et al. |
| 8,580,323 B2 | 11/2013 | Yan et al. |
| 8,591,880 B2 | 11/2013 | Chou et al. |
| 8,603,946 B2 | 12/2013 | Bernaert et al. |
| 8,968,722 B2 | 3/2015 | Wittke |
| 8,986,768 B2 | 3/2015 | Tikanmäki et al. |
| 9,149,051 B2 | 10/2015 | Prakash et al. |
| 9,167,824 B2 | 10/2015 | Carrigan et al. |
| 9,180,077 B2 | 11/2015 | Lambelet et al. |
| 10,542,763 B2 | 1/2020 | Ur Rehman et al. |
| 2002/0031571 A1 | 3/2002 | Couzy et al. |
| 2002/0119234 A1 | 8/2002 | Finocchiaro |
| 2002/0182287 A1 | 12/2002 | Marshall et al. |
| 2002/0192347 A1 | 12/2002 | Couzy et al. |
| 2003/0059512 A1 | 3/2003 | Kopf et al. |
| 2004/0040448 A1 | 3/2004 | Dunker et al. |
| 2004/0139864 A1 | 7/2004 | Kopf et al. |
| 2004/0142068 A1 | 7/2004 | Kopf et al. |
| 2004/0142086 A1 | 7/2004 | Kopf et al. |
| 2005/0053707 A1 | 3/2005 | Kopf et al. |
| 2005/0196508 A1 | 9/2005 | Wang |
| 2005/0214409 A1 | 9/2005 | Tossavainen et al. |
| 2006/0216357 A1 | 9/2006 | Cupp et al. |
| 2007/0098871 A1 | 5/2007 | Dunker et al. |
| 2007/0166447 A1 | 7/2007 | Ur-Rehman et al. |
| 2007/0286937 A1 | 12/2007 | Baechler et al. |
| 2008/0268100 A1 | 10/2008 | Tervala et al. |
| 2009/0123602 A1 | 5/2009 | Yan et al. |
| 2009/0238917 A1 | 9/2009 | Merrill et al. |
| 2009/0252849 A1 | 10/2009 | Phillips |
| 2010/0055286 A1 | 3/2010 | Tikanmaki et al. |
| 2010/0055289 A1 | 3/2010 | Kallioinen et al. |
| 2010/0080866 A1 | 4/2010 | Araki et al. |
| 2010/0215627 A1 | 8/2010 | Lim et al. |
| 2010/0215828 A1 | 8/2010 | Tossavainen et al. |
| 2010/0285175 A1 | 11/2010 | Hendriksen et al. |
| 2011/0038983 A1 | 2/2011 | Cupp et al. |
| 2011/0059220 A1 | 3/2011 | Tossavainen et al. |
| 2011/0097442 A1 | 4/2011 | Harju et al. |
| 2011/0256295 A1 | 10/2011 | Heino et al. |
| 2012/0034367 A9 | 2/2012 | Tossavainen et al. |
| 2012/0040051 A1 | 2/2012 | Chen et al. |
| 2012/0040052 A1 | 2/2012 | Carrigan et al. |
| 2012/0164298 A1 | 6/2012 | Robinson et al. |
| 2012/0189733 A1 | 7/2012 | Braun et al. |
| 2012/0232023 A1 | 9/2012 | Harju et al. |
| 2013/0216681 A1 | 8/2013 | Milani et al. |
| 2013/0230623 A1 | 9/2013 | Sibakov et al. |
| 2013/0309353 A1 | 11/2013 | Ur-Rehman et al. |
| 2013/0309354 A1 | 11/2013 | Ur-Rehman et al. |
| 2014/0017332 A1 | 1/2014 | Tikanmäki et al. |
| 2014/0205718 A1 | 7/2014 | Kallioinen et al. |
| 2014/0212565 A1 | 7/2014 | Bradley et al. |
| 2014/0302219 A1 | 10/2014 | Tikanmäki et al. |
| 2015/0086675 A1 | 3/2015 | Johansen et al. |
| 2017/0105432 A1 | 4/2017 | Karanewsky et al. |

FOREIGN PATENT DOCUMENTS

| | | |
|---|---|---|
| JP | 2008/054627 | 3/2008 |
| WO | WO 90/13227 | 11/1990 |
| WO | WO 00/51440 | 9/2000 |
| WO | WO 2006/048457 | 5/2006 |
| WO | WO 2007/009187 | 1/2007 |
| WO | WO 2008/000895 | 1/2008 |
| WO | WO 2009/105626 | 8/2009 |
| WO | WO 2010/023364 | 3/2010 |
| WO | WO 2012/007446 | 1/2012 |
| WO | WO 2014/163485 | 10/2014 |
| WO | WO 2014/163486 | 10/2014 |
| WO | WO 2014/177762 | 11/2014 |
| WO | WO 2015/079108 | 6/2015 |
| WO | WO 2015/086746 | 6/2015 |
| WO | WO 2015/095769 | 6/2015 |
| WO | WO 2015/132402 | 9/2015 |
| WO | WO 2017/192967 | 11/2017 |

OTHER PUBLICATIONS

Rashidinejad et al., The behaviour of green tea catechins in a full-fat system under conditions mimicking the cheesemaking process, International Journal of Food Sciences and Nutrition, 2016, vol. 67, No. 6, 624-631.

Schuck, P., Spray dryng of dairy products: state of the art, Lait, 2002, 375-382.

Rotronic, Milk Powder Production, Apr. 8, 2015, https://www.rotronic.com/en-US/rotronic-cases-read?id=364/.

Yildirim-Elikoglu et al., Interactions between milk proteins and polyphenols: Binding mechanisms, related changes, and the future trends in the dairy industry. Food Reviews International, 34(7), 665-697, Oct. 2018.

Chemistry and Biology, vol. 44, No. 10, 2006, pp. 688-698, including concise explanation of relevance in English.

Liz Webber, Protein craze extends to fortified milk, Supermarket News, 2014, 4 pages.

Kazuhiro Hamaguchi, Yeast Neutral Lactase, Milk Science, 2011, vol. 60, No. 2, pp. 99-104, including concise explanation of relevance in English.

Therese Jansson et al., Lactose-Hydrolyzed Milk Is More Prone to Chemical Changes during Storage than Conventional Ultra-High-Temperature (UHT) Milk, J. Agric. Food Chem., 2014, 62, pp. 7886-7896.

Journal of the Agricultural Chemical Society, 1956, vol. 30, No. 6, pp. A60-A65, including concise explanation of relevance in English.

Gerry P. Schamberger et al., Effect of green tea flavonoids on Maillard browning in UHT milk, ScienceDirect, LWT 40, 2007, pp. 1410-1417.

Stacy L. Schwambach et al., Reduction of Stale Flavor Development in Low-Heat Skim Milk Powder via Epicatechin Addition, J. Agric. Food Chem., 2006, vol. 54, No. 2, pp. 502-508.

Study of tea, Front line, Shizuoka Shimbun, 2012, p.1, including concise explanation of relevance in English.

NON-BROWNING LACTOSE-FREE MILK POWDER AND METHODS OF MAKING SAME

REFERENCE TO RELATED APPLICATIONS

This application is a continuation application of U.S. patent application Ser. No. 15/828,499, filed on Dec. 1, 2017, now U.S. Pat. No. 10,542,763, which claims the benefit of U.S. Provisional Application Ser. No. 62/429,090, filed on Dec. 2, 2016, the disclosures of which are incorporated herein by reference in their entirety.

BACKGROUND OF THE INVENTION

The present invention relates generally to processes for preparing dry or powder dairy compositions having low lactose contents and containing polyphenol compounds, and to the resultant dry or powder dairy compositions.

SUMMARY OF THE INVENTION

This summary is provided to introduce a selection of concepts in a simplified form that are further described herein. This summary is not intended to identify required or essential features of the claimed subject matter. Nor is this summary intended to be used to limit the scope of the claimed subject matter.

Dry or powder dairy compositions containing polyphenols are disclosed and described herein. One such dry or powder dairy composition can comprise from about 35 to about 90 wt. % protein (or from about 40 to about 80 wt. %, or from about 40 to about 65 wt. %), from about 10 to about 35 wt. % carbohydrates (or from about 17 to about 33 wt. %, or from about 15 to about 30 wt. %), less than or equal to about 1.5 wt. % lactose (or less than or equal to about 1 wt. %, 0.5 wt. %, or 0.1 wt. %), and from about 100 to about 10,000 ppm polyphenols (or from about 250 to about 7,500 ppm, or from about 500 to about 3,500 ppm).

Fluid or liquid dairy compositions containing polyphenols also are disclosed and described herein. A representative fluid or liquid dairy composition, often referred to as a concentrated fluid dairy composition, can comprise from about 4 to about 30 wt. % protein, from about 2 to about 30 wt. % carbohydrates, less than or equal to about 1.5 wt. % lactose, and from about 20 to about 2,000 ppm polyphenols. Another representative fluid or liquid dairy composition, often referred to as a un-concentrated or a reconstituted fluid dairy composition, can comprise from about 2 to about 8 wt. % protein, from about 1 to about 4 wt. % carbohydrates, less than or equal to about 0.5 wt. % lactose, and from about 10 to about 1,000 ppm polyphenols.

Unexpectedly, and beneficially, both the dry and fluid dairy compositions have improved organoleptic properties. Processes for preparing dry dairy compositions also are disclosed herein. In these processes, polyphenols are added to various dairy products or component-rich dairy fractions, followed by a subsequent drying step to from the dry dairy composition. The liquid dairy composition typically has less cooked flavor and less sulfur odor as compared to comparable compositions in which polyphenols are not added. The dry or powder dairy compositions resulting from the polyphenol-treated liquids typically have less brown color and better oxidative stability than that of comparable powdered dairy composition prepared without polyphenols. Generally, the problem of browning or discoloration of milk powders is more severe when lactose-hydrolyzed milks and high protein milks are converted into powders.

By mixing the dry or powder dairy compositions disclosed herein with water, a reconstituted fluid milk product can be produced. Generally, this reconstituted fluid milk product has less cooked flavor, less sulfur odor, and/or less brown color than that of a comparable reconstituted dairy composition without polyphenols.

Another process for preparing a dry dairy composition can comprise combining two or more component-rich fractions and removing at least a portion of the water to form an intermediate dairy product, drying the intermediate dairy product to form a dry intermediate dairy product, and adding a high solids mineral/flavor-rich fraction to the dry intermediate dairy product to form a mixture, and optionally instantizing and/or agglomerating the mixture to form the dry dairy composition. In addition to producing low-lactose or lactose-free milk powders, this process for preparing dry dairy compositions can be used to produce other suitable milk products (i.e., without reduced lactose content).

Another representative process for preparing a dry dairy composition can comprise adding polyphenols to a dairy product to form a fluid dairy composition, removing at least a portion of water from the fluid dairy composition to form a concentrated dairy composition, and drying the concentrated dairy composition to form the dry dairy composition. Yet another representative process for preparing a dry dairy composition can comprise adding lactase enzyme to a dairy product to form a fluid dairy product, removing at least a portion of water from the fluid dairy product to form a concentrated dairy product, adding polyphenols to the concentrated dairy product to form a concentrated dairy composition, and drying the concentrated dairy composition to form the dry dairy composition.

Both the foregoing summary and the following detailed description provide examples and are explanatory only. Accordingly, the foregoing summary and the following detailed description should not be considered to be restrictive. Further, features or variations can be provided in addition to those set forth herein. For example, certain aspects can be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition can be applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect, and/or each and every feature disclosed herein, all combinations that do not detrimentally affect the designs, compositions, processes, and/or methods described herein are contemplated with or without explicit description of the particular combination. Additionally, unless explicitly recited otherwise, any aspect and/or feature disclosed herein can be combined to describe inventive features consistent with the present disclosure.

While compositions and processes are described herein in terms of "comprising" various components or steps, the compositions and processes also can "consist essentially of" or "consist of" the various components or steps, unless stated otherwise.

The terms "a," "an," and "the" are intended to include plural alternatives, e.g., at least one, unless otherwise specified. For instance, the disclosure of "a component-rich fraction" is meant to encompass one, or mixtures or combinations of more than one, component-rich fraction, unless otherwise specified.

The abbreviation "ppm" means parts per million, and is on a weight basis unless otherwise specified.

In the disclosed processes, the terms "adding" and "combining" encompass the contacting of components in any order, in any manner, and for any length of time, unless otherwise specified. For example, the components can be added or combined by blending or mixing.

Although any methods and materials similar or equivalent to those described herein can be used in the practice or testing of the invention, the typical methods and materials are herein described.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. As a representative example, the protein content of a fluid dairy composition can be in certain ranges in various aspects of this invention. By a disclosure that the protein content can be in a range from about 2 to about 8 wt. %, the intent is to recite that the protein content can be any protein content within the range and, for example, can be equal to about 2, about 3, about 4, about 5, about 6, about 7, or about 8 wt. %. Additionally, the protein content can be within any range from about 2 to about 8 wt. % (for example, from about 3 to about 7 wt. %), and this also includes any combination of ranges between about 2 and about 8 wt. % (for example, the protein content can be in a range from 2.5 to about 4.5 wt. % or from about 6 to about 8 wt. %). Likewise, all other ranges disclosed herein should be interpreted in a manner similar to this example.

The term "about" means that amounts, sizes, formulations, parameters, and other quantities and characteristics are not and need not be exact, but may be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

Generally, milk powders are manufactured to preserve the nutrition of milk for longer periods of time. Fluid milk obtained from the milking of domesticated mammals is mostly water; for example, cow's milk contains about 87 wt. % water. Moreover, fluid milk is an ideal media for the growth of bacteria, and spoils rapidly due to being an excellent source of nutrients and high water activity. However, converting fluid milk into powder reduces the water activity, which in turn prevents the growth of bacteria. Therefore, converting low solids fluid milk into a dry powder can help to increase shelf life of milk significantly.

Another benefit of milk powder manufacturing is to balance the milk supply within high milk production areas and those areas where milk production is either impossible or not economically feasible. In certain countries in Africa and Far East Asia, fluid milk production does not meet consumer demand; therefore, the production of milk powders helps to alleviate the pressures on the dairy market by reducing transportation and storage costs, as well as extending the shelf life in an environmentally responsible manner.

Furthermore, milk powder manufacturing also helps to stabilize milk supply due to seasonal variations in milk production. Often, when the demand of milk products is very high, the production of milk is low and, conversely, when the demand for milk is low, production is high. Excess milk production during periods of over-supply can be converted to milk powders to meet the demand for milk products during lean periods of milk production. As above, the removal of water from fluid milk reduces storage and transportation costs.

For example, during the manufacture of milk powders, milk obtained from mammals (e.g., like cow's milk) at 12 wt. % total solids can be pasteurized, followed by concentrating under vacuum by evaporators to 48-52 wt. % total solids. Heating milk under vacuum allows milk to boil at lower temperatures as opposed to heating under standard atmospheric conditions. However, under vacuum, fresh and native flavor compounds also are removed from the milk, and for this reason, recombined milks made from traditional milk powders do not retain the fresh taste of pasteurized fluid milk. Accordingly, an objective of this invention is to reduce or prevent the loss of the fresh dairy flavors during evaporation under vacuum and to produce a milk powder that, when reconstituted to a fluid dairy composition, is comparable to, if not more preferred than, pasteurized fluid milk.

Dry dairy compositions (e.g., powdered milk products) and fluid dairy compositions (e.g., reconstituted liquid milk products) containing polyphenols are disclosed, and methods for producing such dairy compositions are described. The use of a relatively small amount of polyphenol compounds, unexpectedly, results in higher quality milk products with better organoleptic properties, for instance, a reduction in the undesirable cooked flavor of a milk product, a reduction in the undesirable sulfur odor of a milk product, and/or a reduction in the undesirable brown color of a milk product.

Dry or Powder Dairy Compositions

Aspects of this invention are directed to dry dairy compositions. Dry dairy compositions also may be referred to herein as powder dairy compositions or powdered dairy compositions. An illustrative examples of a dry dairy composition of this invention is a low-lactose or lactose-free milk powder. Such dry (or powder) dairy compositions can comprise from about 35 to about 90 wt. % protein, from about 10 to about 35 wt. % carbohydrates, less than or equal to about 1.5 wt. % lactose, and from about 100 to about 10,000 ppm polyphenols. The ppm is on a weight basis, and the relative amounts of protein, carbohydrates, lactose, and polyphenols (polyphenol compounds) are based on the total weight of the dry dairy composition.

In an aspect, the dry (or powder) dairy composition can comprise from about 40 to about 80 wt. % protein, from about 17 to about 33 wt. % carbohydrates, less than or equal to about 0.5 wt. % lactose, and from about 250 to about 7,500 ppm polyphenols, or alternatively, the dry (or powder) dairy composition can comprise from about 40 to about 65 wt. % protein, from about 15 to about 30 wt. % carbohydrates, less than or equal to about 0.1 wt. % lactose, and from about 500 to about 3,500 ppm polyphenols. As would be recognized by those of skill in the art, the total amounts of any components of the dry dairy compositions will not exceed 100 wt. %.

Dry dairy compositions encompassed herein are not limited solely to the components and respective amounts provided hereinabove. These dry dairy compositions can have any of the following components and respective amounts provided below, and in any combination.

In accordance with aspects of this invention, any dry (or powder) dairy composition can contain from about 35 to about 90 wt. % protein, from about 40 to about 80 wt. % protein, or form about 40 to about 65 wt. % protein. Additionally, the dry dairy composition can contain from about 18 to about 35 wt. % carbohydrates, from about 17 to about 33 wt. % carbohydrates, or from about 15 to about 30 wt. % carbohydrates. This represents the total amount of carbohydrates, and this generally includes the total of lactose, glucose, and galactose (e.g., the lactose can be converted to glucose and galactose by treatment of lactose with lactase enzyme, as would be recognized by one of skill in the art, and therefore, the lactose content is very low). The dry dairy composition typically contains less than or equal to about 1.5 wt. % lactose, and more often less than or equal to about 1 wt. % lactose, less than or equal to about 0.5 wt. % lactose, or less than or equal to about 0.1 wt. % lactose. Generally, the dry dairy composition contains from about 100 to about 10,000 ppm polyphenols, from about 250 to about 7,500 ppm polyphenols, or from about 500 to about 3,500 ppm polyphenols. Other appropriate amounts and ranges for the respective amounts of protein, carbohydrates, lactose, and polyphenols in the dry dairy composition are readily apparent from this disclosure.

Moreover, the dry dairy composition also can contain minerals and fat, and the respective amounts of minerals and fat are not particularly limited. Often, the dairy composition can contain from about 3 wt. % to about 12 wt. % ash (or minerals); alternatively, from about 4 wt. % to about 11 wt. % ash (or minerals); or alternatively, from about 5 to about 10 wt. % ash (or minerals). The mineral content (in wt. %) of any of the dry/powder or fluid/liquid compositions disclosed herein is very similar to the ash content (in wt. %), as determined by the ash test described herein. Therefore, the ash content and the mineral content are used interchangeably in this disclosure. The fat content often can range from low fat content to high fat content, depending upon the type of low-lactose or lactose-free milk powder. Accordingly, the dry dairy composition can contain from about 0.1 wt. % to about 27 wt. % fat; alternatively, from about 0.1 to about 3 wt. % fat (low fat); or alternatively, from about 5 to about 27 wt. % fat. Other appropriate amounts and ranges for the respective amounts of minerals and fat in the dry dairy composition are readily apparent from this disclosure.

The dry (or powder) dairy composition, as its name implies, is "dry" or a "powder" as opposed to a fluid or liquid dairy composition. Often, the dry dairy composition can be described as being a free-flowing powder. Additionally, or alternatively, the dry (or powder) dairy composition can be described by its percent solids. In one aspect, the dry dairy composition can have a total solids content of greater than or equal to about 93 wt. %, while in another aspect, the dry dairy composition can have a total solids content of greater than or equal to about 95 wt. %, and in yet another aspect, the dry dairy composition can have a total solids content of greater than or equal to about 97 wt. %.

As would be readily recognized by those of skill in the art, in addition to aforementioned components, the dry dairy composition can include other ingredients (e.g., flavors and additives) at any suitable amounts. Illustrative examples of flavors and additives include, but are not limited to, sugars/sweeteners, flavorants, preservatives, stabilizers, vitamins, pH adjusting agents, colorants, and the like, as well as any mixture or combination thereof. Consistent with certain aspects of this invention, the dry dairy composition does not contain cocoa powder (i.e., the powder is not chocolate milk powder), or can be substantially free of cocoa powder (i.e., less than 0.1 wt. %, and often less than 0.05 wt. %).

Fluid or Liquid Dairy Compositions

Other aspects of this invention are directed to fluid dairy compositions. Fluid dairy compositions also may be referred to herein as liquid dairy compositions, whether these compositions are concentrated, un-concentrated, or reconstituted. As would be recognized by those of skill in the art, the total amounts of any components of the fluid dairy compositions will not exceed 100 wt. %. Any ppm quantities are on a weight basis, and the respective amounts of any components of fluid dairy compositions disclosed herein are based on the total weight of the fluid dairy composition, unless stated otherwise.

In one aspect, a "concentrated" fluid (or liquid) dairy composition is provided, and in this aspect, the fluid composition can comprise from about 4 to about 30 wt. % protein, from about 2 to about 30 wt. % carbohydrates, less than or equal to about 1.5 wt. % lactose, and from about 20 to about 2,000 ppm polyphenols. This composition is described as "concentrated" because normally at least a portion of the water from an "un-concentrated" fluid composition (discussed further hereinbelow) has been removed using reverse osmosis, forward osmosis, evaporation, or other suitable technique, and prior to drying to form a dry (or powder) dairy composition. Other representative concentrated fluid dairy compositions can comprise from about 6 to about 20 wt. % protein, from about 3 to about 15 wt. % carbohydrates, less than or equal to about 0.5 wt. % lactose, and from about 50 to about 1,500 ppm polyphenols; or alternatively, from about 8 to about 14 wt. % protein, from about 3.5 to about 7 wt. % carbohydrates, less than or equal to about 0.2 wt. % lactose, and from about 100 to about 1,000 ppm polyphenols.

Concentrated fluid dairy compositions encompassed herein are not limited solely to the components and respective amounts provided hereinabove. These concentrated fluid dairy compositions can have any of the following components and respective amounts provided below, and in any combination.

In accordance with aspects of this invention, any concentrated fluid (or liquid) dairy composition can contain from about 4 to about 30 wt. % protein, from about 6 to about 20 wt. % protein, or from about 8 to about 14 wt. % protein. Additionally, the concentrated fluid dairy composition can contain from about 2 to about 30 wt. % carbohydrates, from about 3 to about 15 wt. % carbohydrates, or from about 3.5 to about 7 wt. % carbohydrates. This represents the total amount of carbohydrates, and this generally includes the total of lactose, glucose, and galactose (e.g., the lactose can be converted to glucose and galactose by treatment of lactose with lactase enzyme, as would be recognized by one of skill in the art, and therefore, the lactose content is very low). The concentrated fluid dairy composition typically contains less than or equal to about 1.5 wt. % lactose, and more often less than or equal to about 0.5 wt. % lactose, or less than or equal to about 0.2 wt. % lactose. Generally, the fluid dairy composition contains from about 20 to about 2,000 ppm polyphenols, from about 50 to about 1,500 ppm polyphenols, or from about 100 to about 1,000 ppm polyphenols. Other appropriate amounts and ranges for the respective amounts of protein, carbohydrates, lactose, and polyphenols in the concentrated fluid dairy composition are readily apparent from this disclosure.

Moreover, the concentrated fluid composition also can contain minerals and fat, and the respective amounts of minerals and fat are not particularly limited. Often, the dairy composition can contain from about 1 wt. % to about 10 wt. % minerals; alternatively, from about 1 wt. % to about 5 wt. % minerals; or alternatively, from about 1 to about 4 wt. % minerals. The fat content of the concentrated fluid composition often can range from low fat content fluid compositions to high fat content fluid compositions, as desired. Accordingly, the concentrated fluid dairy composition can contain from about 0.1 wt. % to about 30 wt. % fat; alternatively, from about 0.1 to about 2 wt. % fat (low fat); or alternatively, from about 1 to about 22 wt. % fat. Other appropriate amounts and ranges for the respective amounts of minerals and fat in the concentrated fluid dairy composition are readily apparent from this disclosure.

The concentrated fluid (or liquid) dairy composition, as its name implies, is "concentrated" and thus has a reduced water content. For example, the concentrated fluid dairy composition can have a total solids content in a range from about 10 to about 40 wt. %, while in another aspect, the concentrated fluid dairy composition can have a total solids content in a range from about 12 to about 35 wt. %, and in yet another aspect, the concentrated fluid dairy composition can have a total solids content in a range from about 15 to about 25 wt. %.

As would be readily recognized by those of skill in the art, in addition to aforementioned components, the concentrated fluid dairy composition can include other ingredients (e.g., flavors and additives) at any suitable amounts.

In another aspect, an "un-concentrated" or "reconstituted" fluid (or liquid) dairy composition is provided, and in this aspect, the fluid dairy composition can comprise from about 2 to about 8 wt. % protein, from about 1 to about 4 wt. % carbohydrates, less than or equal to about 0.5 wt. % lactose, and from about 10 to about 1,000 ppm polyphenols.

This composition can be described as "un-concentrated" because this composition can be a fluid composition prior to removal of significant amounts of water, such as in an evaporation step. This composition also can be described as "reconstituted" because this composition can result from reconstituting any of the dry (or powder) compositions disclosed herein. Other representative un-concentrated or reconstituted fluid dairy compositions can comprise from about 3 to about 7 wt. % protein, from about 1.5 to about 3.5 wt. % carbohydrates, less than or equal to about 0.2 wt. % lactose, and from about 25 to about 750 ppm polyphenols; or alternatively, from about 4 to about 6.5 wt. % protein, from about 1.8 to about 3.2 wt. % carbohydrates, less than or equal to about 0.1 wt. % lactose, and from about 50 to about 500 ppm polyphenols.

Un-concentrated or reconstituted fluid dairy compositions encompassed herein are not limited solely to the components and respective amounts provided hereinabove. These un-concentrated or reconstituted fluid dairy compositions can have any of the following components and respective amounts provided below, and in any combination.

In accordance with aspects of this invention, any un-concentrated or reconstituted fluid (or liquid) dairy composition can contain from about 2 to about 8 wt. % protein, from about 3 to about 7 wt. % protein, or from about 4 to about 6.5 wt. % protein. Additionally, the fluid dairy composition can contain from about 1 to about 4 wt. % carbohydrates, from about 1.5 to about 3.5 wt. % carbohydrates, or from about 1.8 to about 3.2 wt. % carbohydrates. This represents the total amount of carbohydrates, and this generally includes the total of lactose, glucose, and galactose (e.g., the lactose can be converted to glucose and galactose by treatment of lactose with lactase enzyme, as would be recognized by one of skill in the art, and therefore, the lactose content is very low). The fluid dairy composition typically contains less than or equal to about 0.5 wt. % lactose, and more often less than or equal to about 0.2 wt. % lactose, or less than or equal to about 0.1 wt. % lactose. Generally, the fluid dairy composition contains from about 10 to about 1,000 ppm polyphenols, from about 25 to about 750 ppm polyphenols, or from about 50 to about 500 ppm polyphenols. Other appropriate amounts and ranges for the respective amounts of protein, carbohydrates, lactose, and polyphenols in the un-concentrated or reconstituted fluid dairy composition are readily apparent from this disclosure.

Moreover, the un-concentrated or reconstituted fluid dairy composition also can contain minerals and fat, and the respective amounts of minerals and fat are not particularly limited. Often, the dairy composition can contain from about 0.2 wt. % to about 2 wt. % minerals; alternatively, from about 0.3 wt. % to about 1.5 wt. % minerals; or alternatively, from about 0.5 to about 1 wt. % minerals. The fat content of the un-concentrated or reconstituted fluid dairy composition often can range from low fat content fluid compositions to high fat content fluid compositions, as desired. Accordingly, this fluid dairy composition can contain from about 0.05 wt. % to about 5 wt. % fat; alternatively, from about 0.05 to about 1 wt. % fat (low fat); or alternatively, from about 0.05 to about 5 wt. % fat. Other appropriate amounts and ranges for the respective amounts of minerals and fat in the un-concentrated or reconstituted fluid dairy composition are readily apparent from this disclosure.

The un-concentrated or reconstituted fluid (or liquid) dairy composition, as its name implies, has a significant water content. For example, the un-concentrated or reconstituted fluid dairy composition can have a total solids content in a range from about 5 to about 15 wt. %, while in another aspect, the un-concentrated or reconstituted fluid dairy composition can have a total solids content in a range from about 6 to about 14 wt. %, and in yet another aspect, the un-concentrated or reconstituted fluid dairy composition can have a total solids content in a range from about 7 to about 13 wt. %.

As would be readily recognized by those of skill in the art, in addition to aforementioned components, the un-concentrated or reconstituted fluid dairy composition can include other ingredients (e.g., flavors and additives) at any suitable amounts.

Preparing Dry or Powder Dairy Compositions

In one aspect of this invention, a process for preparing a dry (or powder) dairy composition is provided, and in this aspect, the process can comprise (or consist essentially of, or consist of) (i) adding polyphenols to a dairy product to form a fluid (or liquid) dairy composition, (ii) removing at least a portion of the water from the fluid dairy composition to form a concentrated dairy composition, and (iii) drying the concentrated dairy composition to form the dry (or powder) dairy composition. Consistent with this aspect of the invention, the dry dairy composition can be any dry (or powder) dairy composition disclosed herein, the fluid dairy composition can be any un-concentrated (or reconstituted) fluid dairy composition disclosed herein, and the concentrated dairy composition can be any concentrated fluid dairy composition disclosed herein. The dairy product can be any suitable dairy product, non-limiting examples of which can include a lactose free skim milk, a lactose free reduced fat milk, and the like.

In another aspect, a process for preparing a dry dairy composition is provided, and in this aspect, the process can comprise (or consist essentially of, or consist of) (i) fractionating a milk product into two or more component-rich fractions, (ii) adding lactase enzyme to at least one component-rich fraction, (iii) combining the fractions in step (i) and step (ii) and removing at least a portion of the water to form a formulated dairy product, (iv) adding polyphenols to the formulated dairy product to form a concentrated dairy composition, and (v) drying the concentrated dairy composition to form the dry dairy composition. Thus, one or more component-rich fractions from step (i) can be combined with the lactase-treated fraction (or fractions) of step (ii), followed by removing at least a portion of the water to form the formulated dairy product. Consistent with this aspect of the invention, the formulated dairy product can be any suitable formulated dairy product, non-limiting examples of which can include a concentrated lactose free skim milk, a concentrated lactose free reduced fat milk, and the like. Moreover, the dry dairy composition can be any dry dairy composition disclosed herein, and the concentrated dairy composition can be any concentrated fluid dairy composition disclosed herein.

In another aspect, a process for preparing a dry dairy composition is provided, and in this aspect, the process can comprise (or consist essentially of, or consist of) (i) fractionating a milk product into two or more component-rich fractions, (ii) adding polyphenols to at least one component-rich fraction, (iii) combining the fractions in step (i) and step (ii) and removing at least a portion of the water to form a concentrated dairy composition, and (iv) drying the concentrated dairy composition to form the dry dairy composition. Thus, one or more component-rich fractions from step (i) can be combined with the fraction (or fractions) of step (ii) that contain added polyphenols, followed by removing at least a portion of the water to form the concentrated dairy composition. Consistent with this aspect of the invention, the dry dairy composition can be any dry dairy composition disclosed herein, and the concentrated dairy composition can be any concentrated fluid dairy composition disclosed herein.

In another aspect, a process for preparing a dry dairy composition is provided, and in this aspect, the process can comprise (or consist essentially of, or consist of) (i) fractionating a milk product into two or more component-rich fractions, (ii) adding polyphenols to at least one component-rich fraction, (iii) drying the fractions in step (i) and step (ii) either individually or in any combination to form dry dairy fractions, and (iv) combining the dry dairy fractions to form the dry dairy composition. Thus, one or more component-rich fractions from step (i), and the fraction (or fractions) of step (ii) that contain added polyphenols, can be dried individually or in any combination to form dry dairy fractions, followed by combining the dry fractions—in any relative amounts or proportions—to form the dry dairy composition. Consistent with this aspect of the invention, the dry dairy composition can be any dry (or powder) dairy composition disclosed herein.

In another aspect, a process for preparing a dry dairy composition is provided, and in this aspect, the process can comprise (or consist essentially of, or consist of) (i) combining two or more component-rich fractions and removing at least a portion of the water to form a formulated dairy product, (ii) adding lactase enzyme and polyphenols to the formulated dairy product to form a concentrated dairy composition, and (iii) drying the concentrated dairy composition to form the dry dairy composition. Consistent with this aspect of the invention, the formulated dairy product can be any suitable formulated dairy product, non-limiting examples of which can include a concentrated skim milk, a concentrated reduced fat milk, and the like. Moreover, the dry dairy composition can be any dry dairy composition disclosed herein, and the concentrated dairy composition can be any concentrated fluid dairy composition disclosed herein.

In yet another aspect, a process for preparing a dry dairy composition is provided, and in this aspect, the process can comprise (or consist essentially of, or consist of) (i) combining two or more component-rich fractions and removing at least a portion of the water to form a formulated dairy product, (ii) subjecting the formulated dairy product to reverse osmosis (or forward osmosis), (iii) adding lactase enzyme and polyphenols to form a concentrated dairy composition, and (iv) drying the concentrated dairy composition to form the dry dairy composition. Consistent with this aspect of the invention, the formulated dairy product can be any suitable formulated dairy product, non-limiting examples of which can include a concentrated or un-concentrated skim milk, a concentrated or un-concentrated reduced fat milk, and the like. Moreover, the dry dairy composition can be any dry dairy composition disclosed herein, and the concentrated dairy composition can be any concentrated fluid dairy composition disclosed herein.

In still another aspect, a process for preparing a dry dairy composition is provided, and in this aspect, the process can comprise (or consist essentially of, or consist of) (i) fractionating a milk product into two or more component-rich fractions, (ii) adding lactase enzyme to at least one component-rich fraction, (iii) combining the fractions in step (i) and step (ii) and removing at least a portion of the water by reverse osmosis (or forward osmosis) to form a formulated dairy product, (iv) adding polyphenols to the formulated dairy product to form a concentrated dairy composition, and (v) drying the concentrated dairy composition to form the dry dairy composition. Thus, one or more component-rich fractions from step (i) can be combined with the lactase-treated fraction (or fractions) of step (ii), followed by removing at least a portion of the water by reverse osmosis (or forward osmosis) to form the formulated dairy product. Consistent with this aspect of the invention, the formulated dairy product can be any suitable formulated dairy product, non-limiting examples of which can include a concentrated lactose free skim milk, a concentrated lactose free reduced fat milk, and the like. Moreover, the dry dairy composition can be any dry dairy composition disclosed herein, and the concentrated dairy composition can be any concentrated fluid dairy composition disclosed herein.

Other appropriate techniques and procedures for preparing a dry dairy composition containing polyphenols (e.g., adding the polyphenols to any particular dairy product or milk fraction, adding the polyphenols at any particular stage of the process, etc.) are readily apparent from this disclosure. For instance, polyphenols can be added to a concentrated fluid dairy composition containing from about 15 to about 25 wt. % solids, followed by removing additional water to reach about 40 to 50 wt. % solids, followed by drying to form the dry dairy or powder composition.

Generally, the features of any of the processes disclosed herein (e.g., the fluid dairy composition, the concentrated dairy composition, the dry dairy composition, the component-rich fraction, the formulated dairy product, the drying process, among others) are independently described herein and these features can be combined in any combination to further describe the disclosed processes. Moreover, other process steps can be conducted before, during, and/or after any of the steps listed in the disclosed processes, unless stated otherwise. Further, the processes disclosed herein also can be methods for reducing the cooked flavor, sulfur odor, and/or brown color of a dry (or powder) dairy composition. Additionally, dry (or powder) dairy compositions produced in accordance with any of the disclosed methods or processes are within the scope of this disclosure and are encompassed herein.

In the processes disclosed herein, drying can include any suitable drying technique, such as spray drying. If desired, these processes can further comprise a step of instantizing and/or agglomerating after the drying step.

Likewise, a step of removing at least a portion of the water (e.g., a concentrating step) can include any suitable technique, such as an evaporation step, a reverse osmosis step, a forward osmosis step, or operating at any suitable sub-atmospheric conditions, as well as combinations thereof.

In the processes disclosed herein, the step of adding polyphenols can include adding, introducing, or combining the polyphenols with the respective dairy product or component-rich fraction in any suitable manner and over any suitable time period, and using any suitable equipment. Generally, the step of adding polyphenols encompasses the addition of from about 10 to about 10,000 ppm polyphenols, from about 10 to about 5,000 ppm polyphenols, from about 20 to about 5,000 ppm polyphenols, from about 20 to about 2,000 ppm polyphenols, from about 50 to about 5,000 ppm polyphenols, from about 100 to about 5,000 ppm polyphenols, or from about 100 to about 1,000 ppm polyphenols, to the respective dairy product or component-rich fraction.

Any suitable polyphenols can be used in the dairy compositions and processes of this invention. For instance, the polyphenols can comprise catechins, theaflavins, tannins, flavonoids, or any combination thereof; alternatively, catechins; alternatively, theaflavins; alternatively, tannins; or alternatively, flavonoids. Likewise, any suitable source of the polyphenols can be used (e.g., including cocoa beans and cocoa powder), although in particular aspects of this invention, the polyphenol source is not based on cocoa beans or cocoa powder. Generally, due to the nature of the dairy compositions of this invention, the polyphenols are from a food-grade source. Typical sources of the polyphenols can be from green tea, from black tea, or from coffee, and this includes mixtures or combinations of these polyphenol sources. These polyphenol sources can be in any suitable form, such as fresh, concentrated or dried materials (e.g., air or freeze dried), and the respective amount of polyphenols in the polyphenol source can vary based on the respective source and its form (e.g., a freeze dried concentrate). In a particular aspect of this invention, the polyphenols are from a green tea extract. Green tea extract polyphenols can include one or more of catechin, epicatechin, gallocatechin, gallocatechin gallate, epigallocatechin, epicatechin gallate, and/or epigallocatechin gallate.

In the processes disclosed herein, the step of adding the lactase enzyme can include adding, introducing, or combining the lactase enzyme with the respective dairy product or component-rich fraction in any suitable manner and over any suitable time period, and using any suitable equipment. Generally, the lactase enzyme is added at an amount sufficient to convert all or substantially all of the lactose to glucose and galactose, such that a low lactose or lactose-free dairy product or component-rich fraction results. For dry dairy compositions, concentrated fluid dairy compositions, and un-concentrated (or reconstituted) dairy compositions, low-lactose means, respectively, less than or equal to about 1.5 wt. % lactose, less than or equal to about 1.5 wt. % lactose, and less than or equal to about 0.5 wt. % lactose. For dry dairy compositions, concentrated fluid dairy compositions, and un-concentrated (or reconstituted) dairy compositions, lactose-free means, respectively, less than or equal to about 0.5 wt. % lactose, less than or equal to about 0.2 wt. % lactose, and less than or equal to about 0.1 wt. % lactose.

The processes disclosed herein can include a sterilization step (or pasteurization step), whether ultra-high temperature (UHT) sterilization or other suitable heat treatment technique. Accordingly, any milk or dairy product, formulated dairy product, fluid dairy composition, concentrated fluid dairy composition, or component-rich fraction in the processes disclosed herein can be sterilized at any appropriate step in these processes, and using any suitable sterilization technique and equipment. For instance, the fluid or liquid dairy composition can be sterilized either before or after concentration, and before drying to form the dry or powder dairy composition.

Beneficially, and unexpectedly, the processes disclosed herein are very effective at reducing undesirable taste, odor, and/or color characteristics of the fluid (or liquid) or dry (or powder) dairy composition. In particular aspects of this invention, the respective dry dairy compositions produced by the processes disclosed herein can have less cooked flavor, less sulfur odor, and/or less brown color than that of (or as compared to that of) a respective powdered dairy composition prepared without the polyphenols (i.e., without adding polyphenols to the respective dairy product or component-rich fraction), under the same processing conditions (e.g., sterilization conditions) and with the same respective dairy composition amounts (same amount of protein, carbohydrates, lactose, etc.). Hence, the only difference is the presence of absence of polyphenols in the process for preparing a dry dairy composition. Thus, in one aspect, the dry dairy composition can have less cooked flavor, while in another aspect, the dry dairy composition can have less sulfur odor. In another aspect, the dry dairy composition can have less brown color. In yet another aspect, the liquid dairy composition can have less cooked flavor and less sulfur odor, or less cooked flavor and the dry powder has less brown color, or less sulfur odor and less brown color. In still another aspect, the liquid dairy composition can have less cooked flavor, less sulfur odor, and the dry powder has less brown color and better oxidative stability.

Also beneficially, and unexpectedly, the liquid dairy compositions of this invention can have less cooked flavor, less sulfur odor, and/or the dry compositions have less brown color and better oxidative stability than that of (or as compared to that of) a respective fluid or powdered dairy composition without polyphenols, when compared with the same respective dairy composition amounts (same amount of protein, carbohydrates, lactose, etc.). Hence, the only difference is the presence of absence of polyphenols in the fluid or dry dairy composition. Thus, in one aspect, the dry dairy composition can have less cooked flavor, while in another aspect, the dry dairy composition can have less sulfur odor. In another aspect, the dry dairy composition can have less brown color. In yet another aspect, the dry dairy composition can have less cooked flavor and less sulfur odor, or less cooked flavor and less brown color, or less sulfur odor and less brown color. In still another aspect, the dry dairy composition can have less cooked flavor, less sulfur odor, and less brown color.

Aspects of this invention also are directed to processes for reconstituting a milk product, and these processes can comprise mixing water with the any of the dry dairy compositions disclosed herein (e.g., produced in accordance with any of the processes disclosed herein). Moreover, reconstituted milk products produced in accordance with such processes are within the scope of this disclosure and are encompassed herein. In some aspects, the reconstituted milk product can have any of the characteristics disclosed hereinabove for the "reconstituted" (or un-concentrated) fluid (or liquid) dairy composition. As a non-limiting example, the reconstituted fluid dairy composition can comprise from about 2 to about 8 wt. % protein, from about 1 to about 4 wt. % carbohydrates, less than or equal to about 0.5 wt. % lactose, and from about 10 to about 1,000 ppm polyphenols; alternatively, from about 3 to about 7 wt. % protein, from about 1.5 to about 3.5 wt. % carbohydrates, less than or equal to about 0.2 wt. % lactose, and from about 25 to about 750 ppm polyphenols; or alternatively, from about 4 to about 6.5 wt. % protein, from about 1.8 to about 3.2 wt. % carbohydrates, less than or equal to about 0.1 wt. % lactose, and from about 50 to about 500 ppm polyphenols.

Also beneficially, and unexpectedly, the reconstituted fluid dairy compositions of this invention can have less cooked flavor, less sulfur odor, and/or less brown color than that of (or as compared to that of) a respective reconstituted dairy composition without polyphenols, when compared with the same respective dairy composition amounts (same amount of protein, carbohydrates, lactose, etc.). Hence, the only difference is the presence of absence of polyphenols in the reconstituted fluid dairy composition. Thus, in one aspect, the reconstituted fluid dairy composition can have less cooked flavor, while in another aspect, the reconstituted fluid dairy composition can have less sulfur odor. In another aspect, the reconstituted fluid dairy composition can have less brown color. In yet another aspect, the reconstituted fluid dairy composition can have less cooked flavor and less sulfur odor, or less cooked flavor and less brown color, or less sulfur odor and less brown color. In still another aspect, the reconstituted fluid dairy composition can have less cooked flavor, less sulfur odor, and less brown color.

Further aspects of this invention are directed to a process for preparing a dry dairy composition, and in these aspects, this process can comprise combining two or more component-rich fractions and removing at least a portion of the water to form an intermediate dairy product, drying the intermediate dairy product to form a dry intermediate dairy product, and adding a high solids mineral/flavor-rich fraction to the dry intermediate dairy product to form a mixture, and optionally instantizing and/or agglomerating the mixture to form the dry dairy composition. Any dry dairy compositions produced by this process, and the variations described below, also are encompassed herein.

In one aspect, the process further comprises the instantizing step, while in another aspect, the process further comprises the agglomerating step, and in yet another aspect, the process comprises the instantizing and agglomerating steps. As described herein, the component-rich fractions can be produced by any suitable technique, such as a membrane filtration process, which can involve combinations of microfiltration, ultrafiltration, nanofiltration, and reverse osmosis steps. Thus, this process can further comprise a step of fractionating a milk product into the two or more component-rich fractions. Also as described herein, removing at least a portion of the water can comprise an evaporation step, a reverse osmosis step, a forward osmosis step, or operating at sub-atmospheric conditions, or any combination thereof, such as evaporation at sub-atmospheric conditions.

While not being limited thereto, the high solids mineral/flavor-rich fraction in this process can be produced by reverse osmosis, forward osmosis, or other suitable technique. If desired, the solids content of the mineral/flavor-rich fraction can be increased (e.g., using reverse osmosis or forward osmosis) such that the total solids content of the mineral/flavor-rich fraction can be greater than or equal to about 75 wt. %, greater than or equal to about 85 wt. %, or greater than or equal to about 88 wt. %.

The dry intermediate dairy composition often can have a total solids content of greater than or equal to about 85 wt. %, while in another aspect, a total solids content of greater than or equal to about 90 wt. %, and in yet another aspect, a total solids content of greater than or equal to about 95 wt. % (e.g., 96-98 wt. %).

The dry dairy composition often can contain from about 3 wt. % to about 12 wt. % minerals; alternatively, from about 4 wt. % to about 11 wt. % minerals; or alternatively, from about 5 to about 10 wt. % minerals. Other appropriate amounts and ranges for the amount of minerals in the dry dairy composition are readily apparent from this disclosure. Also, while not being limited thereto, the dry dairy composition can have any of the attributes of the low-lactose or lactose-free dry dairy composition disclosed herein, for example, containing from about 35 to about 90 wt. % protein, from about 10 to about 35 wt. % carbohydrates, and less than or equal to about 1.5 wt. % lactose.

However, this process can be utilized to produce dry dairy compositions from milk products other than those that are low-lactose or lactose-free. Non-limiting examples of typical milk products that can be formed into powders using this process can include whole milk, low-fat milk, skim milk, buttermilk, flavored milk, high protein milk, ultra-filtered milk, micro-filtered milk, concentrated milk, evaporated milk, high protein, high calcium, and reduced sugar milk, and the like.

As above, aspects of this invention also are directed to processes for reconstituting a milk product, and such processes can comprise mixing water with the any of the dry dairy compositions disclosed herein (e.g., produced in accordance with a process comprising combining two or more component-rich fractions and removing at least a portion of the water to form an intermediate dairy product, drying the intermediate dairy product to form a dry intermediate dairy product, and adding a high solids mineral/flavor-rich fraction to the dry intermediate dairy product to form a mixture, and optionally instantizing and/or agglomerating the mixture to form the dry dairy composition). Moreover, any reconstituted milk products produced in accordance with such processes are within the scope of this disclosure and are encompassed herein. The reconstituted milk product can have the taste and flavor equivalent to that of a similar fluid (non-powdered) milk product. Thus, the reconstituted milk product can have less cooked flavor, sulfur odor, and/or brown color than that of a reconstituted dairy composition prepared without the separate treatment of the mineral/flavor-rich fraction. Thus, the comparative composition is simply one in which the all of the component-rich fractions are evaporated and dried together.

Component-Rich Fractions

Generally, cow's milk contains approximately 87 wt. % water, 3-4 wt. % protein, 4-5 wt. % carbohydrates, 3-4 wt. % fat, and 0.3-0.7 wt. % minerals. A "component-rich fraction" is meant to encompass any fraction containing at least 15% more of a component of milk (protein, carbohydrates, fat, minerals) than that found in cow's milk. For instance, a protein-rich fraction often can contain from about 5 to about 24 wt. % protein, from about 5 to about 20 wt. % protein, or from about 6 to about 18 wt. % protein. A carbohydrate-rich fraction often can contain from about 6 to about 20 wt. % carbohydrates (i.e., in any form, such as lactose, glucose, galactose, etc.), from about 6 to about 18 wt. % carbohydrates, or from about 7 to about 16 wt. % carbohydrates. A fat-rich fraction often can contain from about 8 to about 45 wt. % fat, from about 15 to 43 wt. % fat, or from about 22 to about 40 wt. % fat. A mineral-rich fraction can contain from about 1 to about 20 wt. % minerals, from about 1 to about 10 wt. % minerals, or from about 1.5 to about 8 wt. % minerals.

These component-rich milk fractions (e.g., protein-rich, fat-rich, etc.) can be produced by any technique known to those of skill in the art. While not limited thereto, the component-rich milk fraction (or milk fractions) can be produced by a membrane filtration process, such as disclosed in U.S. Pat. No. 7,169,428 and U.S. Patent Publication Nos. 2013/0309353 and 2013/0309354, which are incorporated herein by reference in their entirety. For example, fresh or pasteurized raw milk can be fractionated into fat-free milk and cream (fat-rich fraction) by centrifugal separators. The fat-free milk can be fractionated via combinations of microfiltration, ultrafiltration, nanofiltration, and reverse osmosis into a protein-rich fraction, a lactose-rich fraction, a mineral/flavor-rich fraction, and a milk water fraction. Additionally or alternatively, the component-rich milk fraction (or milk fractions) can be produced by a process comprising mixing water and a powder ingredient (e.g., protein powder, lactose powder, mineral powder, etc.).

EXAMPLES

The invention is further illustrated by the following examples, which are not to be construed in any way as imposing limitations to the scope of this invention. Various other aspects, modifications, and equivalents thereof which, after reading the description herein, can suggest themselves to one of ordinary skill in the art without departing from the spirit of the present invention or the scope of the appended claims.

The total amounts of polyphenol compounds (polyphenols; ppm by weight) in certain compositions were determined by high-performance liquid chromatography (also referred to as high-pressure liquid chromatography, HPLC) at an analytical laboratory. First, approximately 15 mL of the milk sample (e.g., concentrated, reconstituted, etc.) were combined with 5 mL of 1 M citric acid in methanol in a centrifuge tube. The sample was placed into a mechanical agitator and mixed for 1 hour. Then, the sample was centrifuged for 10 min, the supernatant was removed and filtered through a 0.2 micron cellulose acetate filter, and placed into a HPLC vial for injection.

For chromatographic analysis, a modified method was developed combining techniques from Arts et al. (2000) and Cooper et al. (2007) (Rapid reversed phase ultra-performance liquid chromatography analysis of major cocoa polyphenols and their inter-relationship of their concentrations in chocolate), incorporated herein by reference in their entirety. 5 µL of the filtered sample were injected on a C18 column (Waters BEH C18 1.7 µm particle size, 50 mm×2.1 mm). Gradient elution was used with solvent A (100:0.1 water and TFA) and solvent B (100:0.1 acetonitrile and TFA). The 15-minute gradient was as follows: 0.0-0.8 min, 90-87% A; 0.8-3.0 min 87-70% A; 3.0-6.0 min 70-50% A; 6.0-10.0 min 50-0% A; 10.0-12.0 min 0-90% A, and then 3 minutes of re-equilibration before the next sample. A photodiode array detector was used and detection was performed at a wavelength of 220 nm for catechin and epicatechin, 325 nm for chlorogenic acid, and 369 nm for myricetin and quercetin. For these compounds, analytical standards were purchased and standard/calibration curves were produced by analyzing 5 different known concentrations of each compound. Standard/calibration curves were based on the peak area produced at the specified wavelength for the respective compound. Based on the HPLC analysis of the filtered sample and the standard/calibration curves, the ppm of the respective polyphenol compound was determined, and then summed to give a total ppm of polyphenol compounds (polyphenols) in the milk sample.

Ash is the residue remaining after ignition in a suitable apparatus at 550° C. to a constant weight (approximately 5 hr); such treatment at 550° C. typically eliminates all organic matter, with the remaining material being primarily minerals (Standard Methods for the examination of dairy products, 17$^{th}$ edition (2004), American Public Health Association, Washington DC). The ash content (or mineral content) was determined in wt. %.

Examples 1-2

For Example 1, raw milk was fractionated and concentrated by a series of membrane filters and recombined to produce protein-rich and lactose-rich milk fractions. Table I summarizes the compositions of the milk fractions used for making the fluid and dry milk compositions of Example 1. The milk fractions were then blended at the milk formulation in Table II to produce a high protein, high lactose dairy formulation, which was then treated with lactase enzyme to convert the lactose to glucose/galactose (no measureable amount of lactose remained). The concentrated fluid dairy composition is shown in Table III with 17.96 wt. % solids, 10.58 wt. % protein, 5.08 wt. % hydrolyzed lactose, and 0.30 wt. % fat. A green tea extract (containing polyphenols) was added to the concentrated dairy composition. An un-concentrated fluid dairy composition is also listed in Table III, which estimates the relative amount of the components if the milk product had not been concentrated. The concentrated fluid dairy composition was then pasteurized at a high temperature of 72° C. for approximately 15 seconds.

Next, the concentrated fluid dairy composition was spray dried to a dry (or powder) dairy composition having a total solids content of 96 wt. % using a two-stage commercial dryer. The dryer had a primary drying chamber and a fluidized bed dryer, and was capable of removing 136.2 kg of water per hour. The spraying device of the dryer was a pressure nozzle. The drying conditions were follows: inlet temperature of ~199-205° C., outlet temperature of ~77-80° C., type of Nozzle=60, core=28, and an inlet pressure of ~1100-1200 psig. The resultant dry powder composition is summarized in Table III.

Samples of the dry dairy composition were further subjected to the following instantizing process. First, 5.1 grams of Sunflower lecithin was dissolved in 150 mL of warm water at ~100° F.; a microfluidizer at 8,000 psig was used to fully disperse the lecithin. Then, 681 grams of the dry (powder) dairy composition was added to a Glatt apparatus (GPCG1 agglomeration chamber). The operating conditions for the Glatt apparatus included a heater air setting of 90° C., an outlet damper for air flow setting of 0.4, and a fluid nozzle air pressure setting of 2.5 bar. After the powder temperature reached 47° C., the lecithin/water mixture was added at rate of 35 mL/min. A total of 150 mL of the lecithin/water mixture was added, and the product temperature decreased to 43° C. The powder was then dried for 4 minutes and the end product temperature was 50° C.

Samples of the dry dairy composition were further subjected to the following agglomeration and instantizing process. First, 681 grams of the dry (powder) dairy composition was charged to the Glatt apparatus under the same conditions as above. After the powder temperature reached 45° C., the lecithin/water mixture (as above) was added at a rate of 35 mL/min for 5 minutes, decreasing the product temperature to 43° C. The powder was then dried for 3 minutes and the end product temperature was 53° C.

Example 2 was conducted in a manner similar to Example 1, but with different un-concentrated fluid, concentrated fluid, and dry dairy compositions. Instead of the skim milk of Example 1, Example 2 was a reduced fat milk product. The respective fluid and dry dairy compositions for Example 2 are summarized in Table IV.

The dry or powder composition in Table IV was reconstituted into a fluid or liquid milk product and ultra-pasteurized. Blind samples of the reconstituted milk product—containing polyphenols—were provided to a large group of 60-70 people for taste testing, and no one in the group could distinguish the samples from traditional fluid (non-powdered) lactose free reduced fat milk.

Examples 3-4

For Example 3, raw milk was separated into cream and skim milk, and the skim milk was then separated into different streams by a membrane filtration process (ultrafiltration, nanofiltration, reverse osmosis) into a protein-rich fraction, a carbohydrate-rich fraction, a mineral/flavor-rich fraction (reverse osmosis retentate), and water. The different fractions were then combined to produce a standard milk product, which was then ultra-pasteurized under vacuum to form the fluid dairy composition of Example 3.

Example 4 was performed in the same manner as Example 3, but all of the fractions except the mineral/flavor-rich fraction (reverse osmosis retentate) were combined and then ultra-pasteurized under vacuum to form an intermediate product. The mineral/flavor rich fraction (reverse osmosis retentate) was ultra-pasteurized without vacuum and then combined with the intermediate product to form the fluid dairy composition of Example 4, which had substantially the same fat, protein, and carbohydrate content as Example 3.

Table V summarizes the organoleptic properties of the fluid dairy compositions of Example 3 and Example 4 using the product specific intensity scale (attributes are scored on a 0 to 15 point scale; means in a row followed by different letters are different (p<0.05)). As shown in Table V, and beneficially, the fluid dairy composition of Example 4 had reduced sulfur flavor and an increase in sweet aromatic flavor, indicating that the separate treatment of the mineral/flavor-rich fraction produced a better tasting milk product. While Examples 3-4 were not dried and converted to powdered milk, it is believed that the similar treatment of mineral/flavor-rich fraction in a process to prepare a dry (or powder) dairy composition would result in a reconstituted milk with taste and flavor comparable to traditional fluid (non-powdered) milk.

Example 5

For Example 5, reduced-fat lactose-free milk powder was produced from approximately 47,000 lb of a pasteurized reduced-fat lactose free high protein milk concentrate. Table VI summarizes the composition of the concentrated fluid dairy composition, which was produced using a membrane filtration process. A commercially-available green tea extract (containing polyphenols) was added to the concentrated dairy composition, and the concentrated dairy composition was pasteurized at a temperature of 75° C. for approximately 15 seconds.

Next, the concentrated fluid dairy composition was spray dried to a dry (or powder) dairy composition having a total solids content of 95.2 wt. % using the spray drying parameters listed in Table VII. Approximately 4,200 lb of the resultant dry powder composition were obtained, and the characteristics of the dry powder composition are summarized in Table VI. The powder of Example 5 was free-flowing without any clumps, and a scorched particle test on the powder was very clean. Samples of the dry milk powder were packaged in 50-lb bags after spray drying. A composition of a representative reconstituted milk product that was produced is also shown in Table VI.

Overall, the quality of the milk powder was excellent, and reconstituted milks made from the milk powders were very good. Reconstituted liquid milk from the milk powder and reconstituted liquid milk in which cocoa powder was then added were compared to control samples of commercial reduced fat milk and commercial reduced fat chocolate milk, as well as respective control samples produced from fresh/liquid milk (instead of powder). These milk products are summarized in Table VIII. These products also were tested after production and throughout a 3-month shelf-life period to determine the sensory quality over time. Reconstituted milks made from the milk powders of Example 5 had a very good flavor and mouthfeel as compared to both control samples. The reduced fat milk retained a fresh, creamy flavor over the course of three months, with a slight browning and very mild milk powder flavor (cooked milk) towards the end of the sampling period. The chocolate milk made from lactose free milk powder of Example 5 had an excellent flavor throughout the testing period. It was very creamy, with a balanced, yet indulgent, chocolate flavor. Most tasters found the chocolate milk made from the lactose free milk powder of Example 5 had superior taste and mouthfeel to both controls, and was consistently ranked as the highest quality product. No powder flavor or off-notes were detected at any time throughout the shelf-life of the chocolate milk produced from lactose free high protein milk powder of Example 5.

In sum, reconstituted milk products made from the lactose-free powders of Example 5 were successfully made with quality and component characteristics (e.g., protein content, fat content) comparable to liquid milk products (i.e., non-powder).

TABLE I

Composition of the raw milk fractions used in Example 1.

| Milk Fraction | Total Solids (wt. %) | Fat (wt. %) | Protein (wt. %) | Lactose (wt. %) | Ash (wt. %) |
|---|---|---|---|---|---|
| Protein-Rich Fraction | 15.43 | 0.37 | 13.28 | 0.74 | 0.92 |
| Lactose-Rich Fraction | 15.00 | 0.01 | 2.00 | 13.00 | — |
| Concentrated Skim Milk Fraction | 18.55 | 0.35 | 12.00 | 3.83 | 2.18 |

TABLE II

Blends of Milk Fractions in Example 1.

| Milk Fraction | Example 1 |
|---|---|
| Protein-rich fraction (wt. %) | 2.5 |
| Lactose-rich fraction (wt. %) | 14.5 |
| Concentrated skim milk fraction (wt. %) | 83 |

TABLE III

Compositions of un-concentrated and concentrated lactose free skim milk, and its powder

| Type of Composition | Total Solids (wt. %) | Fat (wt. %) | Protein (wt. %) | Hydrolyzed lactose (glucose-galactose) (wt. %) | Ash (wt. %) | Polyphenols (ppm) |
|---|---|---|---|---|---|---|
| Un-concentrated | 8.98 | 0.15 | 5.29 | 2.54 | 0.8 | 115 |
| Concentrated | 17.96 | 0.30 | 10.58 | 5.08 | 1.6 | 230 |
| Dry/Powder | 96.0 | 1.60 | 56.55 | 27.15 | 8.55 | 1230 |

TABLE IV

Compositions of un-concentrated and concentrated lactose free reduced fat milk, and its powder

| Type of Composition | Total Solids (wt. %) | Fat (wt. %) | Protein (wt. %) | Hydrolyzed lactose (glucose-galactose) (wt. %) | Ash (wt. %) | Polyphenols (ppm) |
|---|---|---|---|---|---|---|
| Un-concentrated | 10.45 | 1.87 | 5.40 | 2.40 | 0.78 | 115 |
| Concentrated | 21.0 | 3.74 | 10.80 | 4.80 | 1.56 | 230 |
| Dry/Powder | 96.0 | 17.09 | 49.37 | 21.94 | 7.13 | 1050 |

TABLE V

Organoleptic comparison of Examples 3-4

| Attribute | Example 3 | Example 4 |
|---|---|---|
| Aroma character Flavor | Cooked/eggy, sweet | Cooked/eggy, sweet |
| Sweet aromatic | 1.0b | 1.4a |
| Sulfurous | 2.3a | 1.1b |
| Cooked/scalded | 4.6a | 4.5a |
| Milkfat | 1.0b | 1.0b |
| Sweet taste | 2.3a | 2.3a |
| Salty Taste | 1.3a | 1.4a |
| Viscosity | 1.8b | 2.0a |

TABLE VI

Compositions of concentrated lactose free reduced fat milk, its powder, and reconstituted milk

| Type of Composition | Total Solids (wt. %) | Fat (wt. %) | Protein (wt. %) | Hydrolyzed lactose (glucose-galactose) (wt. %) | Lactose (wt. %) | Polyphenols (ppm) |
|---|---|---|---|---|---|---|
| Concentrated | 20.0 | 3.6 | 10.1 | 4.96 | <0.1 | 200-300 |
| Dry/Powder | 95.2 | 17.4 | 52.6 | 18.35 | <0.5 | 950-1600 |
| Reconstituted | 10.5 | 1.4 | 5.6 | N/A | <0.1 | 100-175 |

TABLE VII

Spray Drying Parameters

| | |
|---|---|
| Wet Prod Temperature | 50° F. |
| Ave. Inlet Temperature | 378° F. |
| Ave. Outlet Temperature | 170° F. |
| SB/VFB | 200 F. |
| HPP | 2460 psig |
| Ave. Moisture | 4.85% |
| Ave. Cool Air Temp. | 90° F. |
| Exhaust fan % | 88% |
| Supply fan % | 57% |
| HPP pressure | 2500 |
| HPP % | 51% |
| Feed Pump Hz | 60 Hz |
| Scrubber Pump | 45 psig |
| VFB Air Lock % | 25% |
| Powder Hopper Air Lock % | 25% |
| Powder Recycle Fan % | 100% |
| Air Hammers seconds | 240 |
| Cyclone Pressure | 5.8 psig |
| Dryer Pressure (bars) | −0.4 |
| VFB Screen Pressure (bars) | 0.8 |
| Air Handler Inlet Fan % | 100% |
| Filter Bank Pressure | 55 psig |
| Sonic Horn Seconds | 240 |
| East Airlock Seconds | 5 |
| West Airlock Seconds | 5 |
| Final Airlock Seconds | 5 |

TABLE VIII

Reconstituted milk products

| Product | | Solids (wt. %) | Fat (wt. %) | Protein (wt. %) | Carbs (wt. %) | Ash (wt. %) | pH | Sediment (g/100 g) |
|---|---|---|---|---|---|---|---|---|
| Milk concentrate | | 20.0 | 3.6 | 10.1 | 4.96 | — | — | — |
| Milk powder | | 95.2 | 17.4 | 52.6 | 18.35 | 6.8 | 6.7 | — |
| Reduced fat milk | Commercial samples | 10.4 | 1.9 | 5.4 | 2.43 | 0.8 | 6.9 | 0.5 |
| | | 10.5 | 1.9 | 5.3 | 2.44 | 0.8 | 6.9 | 0.7 |
| | Samples made from fresh milk | 10.6 | 1.9 | 5.2 | 2.73 | 0.8 | 6.9 | 0.6 |
| | | 10.6 | 1.9 | 5.2 | 2.77 | 0.8 | 6.9 | 0.7 |
| | | 10.6 | 1.9 | 5.2 | 2.81 | 0.8 | 6.9 | 0.7 |
| | Samples made from milk powder | 9.6 | 1.6 | 4.9 | 2.36 | 0.7 | 6.9 | 0.5 |
| | | 9.6 | 1.7 | 4.7 | 2.60 | 0.7 | 6.9 | 0.4 |
| | | 9.5 | 1.7 | 4.9 | 2.34 | 0.6 | 6.8 | 0.5 |
| Reduced fat Chocolate Milk | Commercial samples | 13.3 | 1.9 | 5.4 | 4.93 | 1.1 | 6.9 | 1.1 |
| | | 13.3 | 1.9 | 5.3 | 4.95 | 1.1 | 6.9 | 1.5 |
| | Samples made from fresh milk | 13.4 | 1.9 | 5.3 | 5.20 | 1.0 | 7.0 | 4.5 |
| | | 13.4 | 1.9 | 5.3 | 5.24 | 1.0 | 7.0 | 5.2 |
| | | 13.4 | 1.9 | 5.3 | 5.26 | 0.9 | 6.9 | 5.6 |
| | Samples made from milk powder | 14.7 | 2.5 | 5.5 | 5.64 | 1.0 | 6.9 | 2.1 |
| | | 14.7 | 2.5 | 5.6 | 5.65 | 1.0 | 6.9 | 3.1 |
| | | 14.8 | 2.5 | 5.6 | 5.65 | 1.0 | 6.9 | 3.5 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A dry dairy composition comprising from about 35 to about 90 wt. % protein, from about 10 to about 35 wt. % carbohydrates, less than or equal to about 1.5 wt. % lactose, and from about 100 to about 10,000 ppm polyphenols.

Aspect 2. The composition defined in aspect 1, wherein the composition comprises from about 40 to about 65 wt. % protein.

Aspect 3. The composition defined in aspect 1 or 2, wherein the composition comprises from about 15 to about 30 wt. % carbohydrates.

Aspect 4. The composition defined in any one of aspects 1-3, wherein the composition comprises less than or equal to about 0.5 wt. % lactose.

Aspect 5. The composition defined in any one of aspects 1-4, wherein the composition comprises from about 250 to about 7,500 ppm polyphenols.

Aspect 6. The composition defined in any one of aspects 1-5, wherein the composition further comprises from about 0.1 wt. % to about 27 wt. % fat.

Aspect 7. The composition defined in any one of aspects 1-6, wherein the composition further comprises from about 3 wt. % to about 12 wt. % minerals.

Aspect 8. The composition defined in any one of aspects 1-7, wherein the composition has a total solids content of greater than or equal to about 93 wt. %.

Aspect 9. A fluid dairy composition comprising from about 2 to about 8 wt. % protein, from about 1 to about 4 wt.

% carbohydrates, less than or equal to about 0.5 wt. % lactose, and from about 10 to about 1,000 ppm polyphenols.

Aspect 10. The composition defined in aspect 9, wherein the composition comprises from about 3 to about 7 wt. % protein.

Aspect 11. The composition defined in aspect 9 or 10, wherein the composition comprises from about 1.5 to about 3.5 wt. % carbohydrates.

Aspect 12. The composition defined in any one of aspects 9-11, wherein the composition comprises less than or equal to about 0.1 wt. % lactose.

Aspect 13. The composition defined in any one of aspects 9-12, wherein the composition comprises from about 25 to about 750 ppm polyphenols.

Aspect 14. The composition defined in any one of aspects 9-13, wherein the composition further comprises from about 0.05 wt. % to about 5 wt. % fat.

Aspect 15. The composition defined in any one of aspects 9-14, wherein the composition further comprises from about 0.2 wt. % to about 2 wt. % minerals.

Aspect 16. The composition defined in any one of aspects 9-15, wherein the composition has a total solids content of from about 5 to about 15 wt. %.

Aspect 17. A fluid dairy composition comprising from about 4 to about 30 wt. % protein, from about 2 to about 30 wt. % carbohydrates, less than or equal to about 1.5 wt. % lactose, and from about 20 to about 2,000 ppm polyphenols.

Aspect 18. The composition defined in aspect 17, wherein the composition comprises from about 8 to about 14 wt. % protein.

Aspect 19. The composition defined in aspect 17 or 18, wherein the composition comprises from about 3.5 to about 7 wt. % carbohydrates.

Aspect 20. The composition defined in any one of aspects 17-19, wherein the composition comprises less than or equal to about 0.2 wt. % lactose.

Aspect 21. The composition defined in any one of aspects 17-20, wherein the composition comprises from about 50 to about 1,500 ppm polyphenols.

Aspect 22. The composition defined in any one of aspects 17-21, wherein the composition further comprises from about 0.1 wt. % to about 30 wt. % fat.

Aspect 23. The composition defined in any one of aspects 17-22, wherein the composition further comprises from about 1 wt. % to about 10 wt. % minerals.

Aspect 24. The composition defined in any one of aspects 17-23, wherein the composition has a total solids content of from about 10 to about 40 wt. %.

Aspect 25. A process for preparing a dry dairy composition, the process comprising (i) adding polyphenols to a dairy product to form a fluid dairy composition, (ii) removing at least a portion of the water from the fluid dairy composition to form a concentrated dairy composition, and (iii) drying the concentrated dairy composition to form the dry dairy composition.

Aspect 26. The process defined in aspect 25, wherein the dry dairy composition is the dry dairy composition defined in any one of aspects 1-8.

Aspect 27. The process defined in aspect 25 or 26, wherein the fluid dairy composition is the fluid dairy composition defined in any one of aspects 9-16.

Aspect 28. The process defined in any one of aspects 25-27, wherein the concentrated dairy composition is the fluid dairy composition defined in any one of aspects 17-24.

Aspect 29. A process for preparing a dry dairy composition, the process comprising (i) fractionating a milk product into two or more component-rich fractions, (ii) adding lactase enzyme to at least one component-rich fraction, (iii) combining the fractions in step (i) and step (ii) and removing at least a portion of the water to form a formulated dairy product, (iv) adding polyphenols to the formulated dairy product to form a concentrated dairy composition, and (v) drying the concentrated dairy composition to form the dry dairy composition.

Aspect 30. The process defined in aspect 29, wherein the dry dairy composition is the dry dairy composition defined in any one of aspects 1-8.

Aspect 31. The process defined in aspect 29 or 30, wherein the concentrated dairy composition is the fluid dairy composition defined in any one of aspects 17-24.

Aspect 32. A process for preparing a dry dairy composition, the process comprising (i) fractionating a milk product into two or more component-rich fractions, (ii) adding polyphenols to at least one component-rich fraction, (iii) combining the fractions in step (i) and step (ii) and removing at least a portion of the water to form a concentrated dairy composition, and (iv) drying the concentrated dairy composition to form the dry dairy composition.

Aspect 33. The process defined in aspect 32, wherein the dry dairy composition is the dry dairy composition defined in any one of aspects 1-8.

Aspect 34. The process defined in aspect 32 or 33, wherein the concentrated dairy composition is the fluid dairy composition defined in any one of aspects 17-24.

Aspect 35. A process for preparing a dry dairy composition, the process comprising (i) fractionating a milk product into two or more component-rich fractions, (ii) adding polyphenols to at least one component-rich fraction, (iii) drying the fractions in step (i) and step (ii) either individually or in any combination to form dry dairy fractions, and (iv) combining the dry dairy fractions to form the dry dairy composition.

Aspect 36. The process defined in aspect 35, wherein the dry dairy composition is the dry dairy composition defined in any one of aspects 1-8.

Aspect 37. A process for preparing a dry dairy composition, the process comprising (i) combining two or more component-rich fractions and removing at least a portion of the water to form a formulated dairy product, (ii) adding lactase enzyme and polyphenols to the formulated dairy product to form a concentrated dairy composition, and (iii) drying the concentrated dairy composition to form the dry dairy composition.

Aspect 38. The process defined in aspect 37, wherein the dry dairy composition is the dry dairy composition defined in any one of aspects 1-8.

Aspect 39. The process defined in aspect 37 or 38, wherein the concentrated dairy composition is the fluid dairy composition defined in any one of aspects 17-24.

Aspect 40. A process for preparing a dry dairy composition, the process comprising (i) combining two or more component-rich fractions and removing at least a portion of the water to form a formulated dairy product, (ii) subjecting the formulated dairy product to reverse osmosis (or forward osmosis), (iii) adding lactase enzyme and polyphenols to form a concentrated dairy composition, and (iv) drying the concentrated dairy composition to form the dry dairy composition.

Aspect 41. The process defined in aspect 40, wherein the dry dairy composition is the dry dairy composition defined in any one of aspects 1-8.

Aspect 42. The process defined in aspect 40 or 41, wherein the concentrated dairy composition is the fluid dairy composition defined in any one of aspects 17-24.

Aspect 43. A process for preparing a dry dairy composition, the process comprising (i) fractionating a milk product into two or more component-rich fractions, (ii) adding lactase enzyme to at least one component-rich fraction, (iii) combining the fractions in step (i) and step (ii) and removing at least a portion of the water by reverse osmosis (or forward osmosis) to form a formulated dairy product, (iv) adding polyphenols to the formulated dairy product to form a concentrated dairy composition, and (v) drying the concentrated dairy composition to form the dry dairy composition.

Aspect 44. The process defined in aspect 43, wherein the dry dairy composition is the dry dairy composition defined in any one of aspects 1-8.

Aspect 45. The process defined in aspect 43 or 44, wherein the concentrated dairy composition is the fluid dairy composition defined in any one of aspects 17-24.

Aspect 46. The process defined in any one of aspects 25-45, wherein drying comprises spray drying.

Aspect 47. The process defined in any one of aspects 25-46, wherein removing at least a portion of the water comprises an evaporation step, a reverse osmosis step, a forward osmosis step, or operating at sub-atmospheric conditions, or any combination thereof.

Aspect 48. The process defined in any one of aspects 25-47, wherein adding polyphenols comprises adding from about 10 to about 5,000 ppm polyphenols.

Aspect 49. The process defined in any one of aspects 25-48, wherein the polyphenols comprise catechins, theaflavins, tannins, flavonoids, or any combination thereof.

Aspect 50. The process defined in any one of aspects 25-49, wherein the polyphenols are from a food-grade source.

Aspect 51. The process defined in any one of aspects 25-50, wherein the polyphenols are from green tea, black tea, coffee, or a mixture thereof.

Aspect 52. The process defined in any one of aspects 25-51, wherein the polyphenols are from a green tea extract.

Aspect 53. The process defined in any one of aspects 25-52, further comprising a step of instantizing and/or agglomerating after drying.

Aspect 54. The process defined in any one of aspects 25-53, wherein the process is a method for reducing cooked flavor, sulfur odor, and/or brown color of the dry dairy composition.

Aspect 55. The process defined in any one of aspects 25-54, wherein the dry dairy composition has less cooked flavor than that of a powdered dairy composition prepared without the polyphenols.

Aspect 56. The process defined in any one of aspects 25-55, wherein the dry dairy composition has less sulfur odor than that of a powdered dairy composition prepared without the polyphenols.

Aspect 57. The process defined in any one of aspects 25-56, wherein the dry dairy composition has less brown color than that of a powdered dairy composition prepared without the polyphenols.

Aspect 58. A dry dairy composition prepared by the process defined in any one of aspects 25-57.

Aspect 59. The composition defined in any one of aspects 1-8, wherein the dry dairy composition has less cooked flavor, sulfur odor, and/or brown color than that of a powdered dairy composition without the polyphenols.

Aspect 60. A process of reconstituting a milk product, the process comprising mixing water with the dry dairy composition defined in any one of aspects 1-8 or 58-59 to form a reconstituted milk product.

Aspect 61. A reconstituted milk product prepared by the process defined in aspect 60.

Aspect 62. The milk product defined in aspect 61, wherein the reconstituted milk product is the fluid dairy composition defined in any one of aspects 9-16.

Aspect 63. The milk product defined in aspect 61 or 62, wherein the reconstituted milk product has less cooked flavor, sulfur odor, and/or brown color than that of a reconstituted dairy composition without the polyphenols.

Aspect 64. A process for preparing a dry dairy composition, the process comprising (i) combining two or more component-rich fractions and removing at least a portion of the water to form an intermediate dairy product, (ii) drying the intermediate dairy product to form a dry intermediate dairy product, (iii) adding a high solids mineral/flavor-rich fraction to the dry intermediate dairy product to form a mixture, and optionally instantizing and/or agglomerating the mixture to form the dry dairy composition.

Aspect 65. The process defined in aspect 64, wherein the process further comprises a step of fractionating a milk product into the two or more component-rich fractions.

Aspect 66. The process defined in aspect 64 or 65, wherein the high solids mineral/flavor-rich fraction is produced by a process comprising reverse osmosis.

Aspect 67. The process defined in any one of aspects 64-66, wherein removing at least a portion of the water comprises an evaporation step, a reverse osmosis step, a forward osmosis step, or operating at sub-atmospheric conditions, or any combination thereof.

Aspect 68. The process defined in any one of aspects 64-67, wherein the dry dairy composition comprises from about 3 wt. % to about 12 wt. % minerals.

Aspect 69. The process defined in any one of aspects 64-68, wherein the high solids mineral/flavor-rich fraction has a total solids content of greater than or equal to about 85 wt. %.

Aspect 70. The process defined in any one of aspects 64-69, wherein the dry intermediate dairy product has a total solids content of greater than or equal to about 90 wt. %.

Aspect 71. The process defined in any one of aspects 64-70, wherein the process comprises a step of instantizing, a step of agglomerating, or both.

Aspect 72. The process defined in any one of aspects 64-71, wherein the process is a method for reducing cooked flavor, sulfur odor, and/or brown color of the dry dairy composition.

Aspect 73. The process defined in any one of aspects 64-72, wherein the dry dairy composition is the dry dairy composition defined in any one of aspects 1-8.

Aspect 74. A dry dairy composition prepared by the process defined in any one of aspects 64-73.

Aspect 75. A process of reconstituting a milk product, the process comprising mixing water with the dry dairy composition defined in aspect 74 to form a reconstituted milk product.

Aspect 76. A reconstituted milk product prepared by the process defined in aspect 75.

Aspect 77. The milk product defined in aspect 76, wherein the reconstituted milk product is the fluid dairy composition defined in any one of aspects 9-16.

Aspect 78. The milk product defined in aspect 76 or 77, wherein the reconstituted milk product is a high protein milk product.

Aspect 79. The milk product defined in aspect 76 or 77, wherein the reconstituted milk product is a high protein, high calcium, and reduced sugar milk product.

Aspect 80. The milk product defined in any one of aspects 76-79, wherein the reconstituted milk product has less cooked flavor, sulfur odor, and/or brown color than that of a reconstituted dairy composition prepared without the separate treatment of the mineral/flavor-rich fraction.

We claim:

1. A process for preparing a dry dairy composition, the process comprising:
   (i) adding from about 25 to about 750 ppm green tea extract polyphenols to a dairy product to form a fluid dairy composition, wherein the fluid dairy composition comprises:
      from about 3 to about 7 wt. % protein;
      from about 1.5 to about 3.5 wt. % carbohydrates; and
      less than or equal to about 0.5 wt. % lactose;
   (ii) removing at least a portion of water from the fluid dairy composition to form a concentrated dairy composition; and
   (iii) drying the concentrated dairy composition to form the dry dairy composition, wherein the dry dairy composition comprises:
      from about 40 to about 65 wt. % protein;
      from about 15 to about 30 wt. % carbohydrates;
      less than or equal to about 1 wt. % lactose; and
      from about 250 to about 7500 ppm polyphenols.

2. The process of claim 1, wherein:
   removing at least a portion of water comprises an evaporation step, a reverse osmosis step, a forward osmosis step, or operating at sub-atmospheric conditions, or any combination thereof; and
   drying comprises spray drying.

3. The process of claim 1, wherein the polyphenols comprise catechins, flavonoids, or any combination thereof.

4. The process of claim 1, wherein:
   the dry dairy composition has less cooked flavor than that of an otherwise identical powdered dairy composition prepared without the polyphenols;
   the dry dairy composition has less sulfur odor than that of an otherwise identical powdered dairy composition prepared without the polyphenols;
   the dry dairy composition has less brown color than that of an otherwise identical powdered dairy composition prepared without the polyphenols; or
   any combination thereof.

5. The process of claim 1, further comprising a step of:
   pasteurizing the dairy product before step (i);
   pasteurizing the fluid dairy composition before step (ii); or
   pasteurizing the concentrated dairy composition before step (iii).

6. The process of claim 1, further comprising a step of adding lactase enzyme to the dairy product before step (i).

7. The process of claim 1, wherein the dairy product is prepared by a membrane filtration process comprising two or more of microfiltration, ultrafiltration, nanofiltration, and reverse osmosis.

8. The process of claim 1, wherein the dry dairy composition comprises:
   less than or equal to about 0.5 wt. % lactose; and
   from about 500 to about 3500 ppm polyphenols.

9. A dry dairy composition comprising:
   from about 35 to about 90 wt. % protein;
   from about 10 to about 35 wt. % carbohydrates;
   less than or equal to about 1.5 wt. % lactose; and
   from about 100 to about 7500 ppm green tea extract polyphenols.

10. The composition of claim 9, wherein the composition comprises from about 100 to about 3500 ppm polyphenols.

11. The composition of claim 9, wherein the composition comprises:
    from about 40 to about 65 wt. % protein;
    from about 15 to about 30 wt. % carbohydrates;
    less than or equal to about 1 wt. % lactose; and
    from about 250 to about 7500 ppm polyphenols.

12. The composition of claim 11, wherein the composition further comprises:
    from about 0.1 wt. % to about 27 wt. % fat; and
    from about 3 wt. % to about 12 wt. % minerals.

13. The composition of claim 11, wherein the composition has a total solids content of greater than or equal to about 93 wt. %.

14. The composition of claim 11, wherein the dry dairy composition has less cooked flavor, sulfur odor, and/or brown color than that of an otherwise identical powdered dairy composition without the polyphenols.

15. A process of reconstituting a milk product, the process comprising mixing water with the dry dairy composition of claim 11 to form a reconstituted milk product.

16. A reconstituted milk product prepared by the process of claim 15, wherein the reconstituted milk product comprises:
    from about 3 to about 7 wt. % protein;
    from about 1 to about 4 wt. % carbohydrates;
    less than or equal to about 0.2 wt. % lactose; and
    from about 25 to about 750 ppm polyphenols.

17. A process for preparing a dry dairy composition, the process comprising:
    (a) adding from about 50 to about 1500 ppm green tea extract polyphenols to a concentrated dairy product having a total solids content from about 12 to about 35 wt. % to form a concentrated dairy composition, wherein the concentrated dairy composition comprises:
       from about 6 to about 20 wt. % protein;
       from about 3.5 to about 7 wt. % carbohydrates; and
       less than or equal to about 0.5 wt. % lactose; and
    (b) drying the concentrated dairy composition to form the dry dairy composition, wherein the dry dairy composition comprises:
       from about 35 to about 90 wt. % protein;
       from about 10 to about 35 wt. % carbohydrates;
       less than or equal to about 1.5 wt. % lactose; and
       from about 100 to about 10,000 ppm polyphenols.

18. The process of claim 17, wherein the dry dairy composition comprises:
    from about 40 to about 65 wt. % protein;
    from about 15 to about 30 wt. % carbohydrates;
    less than or equal to about 1 wt. % lactose; and
    from about 250 to about 7500 ppm polyphenols.

19. The process of claim 18, wherein drying comprises spray drying.

20. The process of claim 18, wherein:
    the dry dairy composition has a total solids content of greater than or equal to about 93 wt. %; and
    the concentrated dairy product has a total solids content from about 15 to about 25 wt. %.

* * * * *